United States Patent
Winocur

(10) Patent No.: US 8,109,492 B2
(45) Date of Patent: Feb. 7, 2012

(54) LIGHTWEIGHT, POLYMERIC AUTOMOTIVE STRUT SUSPENSION UPPER MOUNTING

(75) Inventor: Paul A. Winocur, Royal Oak, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 889 days.

(21) Appl. No.: 12/144,066

(22) Filed: Jun. 23, 2008

(65) Prior Publication Data

US 2009/0315292 A1 Dec. 24, 2009

(51) Int. Cl.
*B60G 15/00* (2006.01)
(52) U.S. Cl. ............ 267/220; 280/124.147; 188/321.11
(58) Field of Classification Search .............. 267/219, 267/220, 292, 293, 33; 188/321.11; 280/124.145, 280/124.146, 124.147
See application file for complete search history.

(56) References Cited

U.S. PATENT DOCUMENTS

| | | | |
|---|---|---|---|
| 3,279,832 A | 10/1966 | Bergman | |
| 3,596,915 A | 8/1971 | Snidar | |
| 4,747,587 A | 5/1988 | Ferrel | |
| 5,248,134 A * | 9/1993 | Ferguson et al. | 267/220 |
| 5,454,585 A * | 10/1995 | Dronen et al. | 280/124.145 |
| 5,467,971 A | 11/1995 | Hurtubise et al. | |
| 5,788,262 A * | 8/1998 | Dazy et al. | 280/124.155 |
| 6,126,155 A | 10/2000 | Smithe et al. | |
| 6,267,512 B1 | 7/2001 | Beghini et al. | |
| 6,290,218 B1 * | 9/2001 | Mayerbock | 267/220 |
| 6,382,645 B1 | 5/2002 | Gravelle et al. | |
| 6,736,381 B2 * | 5/2004 | Chesne | 267/220 |
| 7,032,912 B2 * | 4/2006 | Nicot et al. | 280/124.147 |
| 7,077,248 B2 * | 7/2006 | Handke et al. | 188/321.11 |
| 7,192,041 B2 * | 3/2007 | Nicot et al. | 280/124.147 |
| 2004/0100057 A1 * | 5/2004 | Nicot et al. | 280/93.5 |
| 2005/0242542 A1 | 11/2005 | Handke et al. | |
| 2006/0125164 A1 * | 6/2006 | Mansueto et al. | 267/220 |
| 2006/0151928 A1 * | 7/2006 | Tamura | 267/219 |
| 2007/0144850 A1 * | 6/2007 | Hattori | 188/322.16 |
| 2007/0267793 A1 * | 11/2007 | Chamousset et al. | 267/220 |
| 2008/0197552 A1 | 8/2008 | Winocur | |

FOREIGN PATENT DOCUMENTS

| | | |
|---|---|---|
| DE | 2916294 A1 | 1/1980 |
| DE | 8235995 U1 | 6/1983 |
| DE | 102008009629 A1 | 9/2008 |
| FR | 2862116 A1 | 5/2005 |
| GB | 2347906 A * | 9/2000 |
| JP | 8-100831 A | 4/1996 |

OTHER PUBLICATIONS

Letter dated Jan. 22, 2011 reporting Chinese Office Action dated Jan. 13, 2011 for Chinese application 200910150341.6 corresponding to U.S. Appl. No. 12/144,066.
U. S. Patent Application of Paul A. Winocur, U.S. Appl. No. 11/677,070, filed on Feb. 21, 2007.

\* cited by examiner

*Primary Examiner* — Bradley King
*Assistant Examiner* — Thomas Irvin

(57) ABSTRACT

A strut top mount utilizing a mount dome including lightweight polymeric material for the primary structural member as a replacement for the steel material that is traditionally used. The utilization of the polymeric material is possible because the factors associated with strut top mount stresses are successfully managed by a strategic geometric arrangement of the components thereof and the body structure to which it interfaces, as for example by the mount dome being configured to seat in abutting relation to a support shell of the strut tower, wherein the polymeric material is placed under compression. A load bypass is provided in the event of a maximum jounce event.

11 Claims, 2 Drawing Sheets

LIGHTWEIGHT, POLYMERIC AUTOMOTIVE STRUT SUSPENSION UPPER MOUNTING

TECHNICAL FIELD

The present invention relates to Macpherson strut type motor vehicle suspension systems, and particularly to single fastener MacPherson strut top mounts, and more particularly to a strut top mount having its primary structural member composed of a polymeric material.

BACKGROUND OF THE INVENTION

Motor vehicle suspension systems are configured so that the wheels are able to follow elevational changes in the road surface as the vehicle travels therealong. When a rise in the road surface is encountered, the suspension responds in "jounce" in which the wheel is able to move upwardly relative to the frame of the vehicle. On the other hand, when a dip in the road surface is encountered, the suspension responds in "rebound" in which the wheel is able to move downwardly relative to the integrated body/frame structure of the vehicle. In either jounce or rebound, a spring (i.e., coil, leaf, torsion, etc.) is incorporated with the body structure in order to provide a resilient response to the respective vertical movements of the wheel with regard to the vehicle body structure. However, in order to prevent wheel bouncing and excessive vehicle body motion, a shock absorber or strut is placed at the wheel to dampen wheel and body motion. An example of a MacPherson strut is disclosed in U.S. Pat. No. 5,467,971.

Due to the high stresses encountered during operation of a strut top mount, it is conventional practice in the art to fabricate strut top mounts having the primary structural element made of steel. In this regard, an example of an innovative strut top mount is exemplified in U.S. patent application Ser. No. 11/677,070, filed Feb. 21, 2007, to Paul A. Winocur, and assigned to the assignee hereof, the disclosure of which is hereby incorporated herein by reference.

One of the goals sought after in the automotive arts is increasing fuel economy based upon decreasing weight of the motor vehicle. Accordingly, it would be very desirable if somehow a strut top mount could be made lighter by somehow overcoming the stress factors that require the primary structural member be made of metal, such that a lighter polymeric material may be utilized as the primary structural member.

SUMMARY OF THE INVENTION

The present invention is a strut top mount which utilizes a lightweight polymeric material for the primary structural member, as a replacement for the steel material that is traditionally used, wherein the utilization of the polymeric material is possible because the factors associated with strut top mount stresses are successfully managed by a strategic geometric arrangement of the components thereof and the body structure to which it interfaces.

The single path strut top mount according to the present invention is configured to supportably seat with respect to a support shell of a strut tower which, at its lower end, is connected to the body structure of the motor vehicle. The strut top mount of the present invention utilizes a mount dome composed of a lightweight polymeric primary structural member, as for example a glass reinforced nylon, and of a resilient body, as for example rubber, which is bonded to the polymeric primary structural member, wherein the shape of the mount dome is complementary to the shape of the support shell of the strut tower, such that the mount dome seats into the support shell in a nestled, embraced manner.

The polymeric primary structural member is annular, having a central polymeric wall, an outer polymeric wall spaced from the central polymeric wall, and a top polymeric wall spanning the central and outer polymeric walls. The resilient body partly overmolds the polymeric structural member, wherein the resilient body bondingly covers the outer and top polymeric walls so as to serve as a resilient interface with the strut tower, the resilient body further bondingly covers the central polymeric wall so as to provide a central resilient element having a cup-shaped metallic insert, and the resilient body bondingly covers the central polymeric wall at a bottom surface thereof so as to provide an abutment element.

A bearing adjoins the central resilient element, adjacent the metallic insert. A jounce bumper plate has an inner plate flange abutting the lower race of the bearing, wherein the jounce bumper plate carries a jounce bumper interface and a spring seat. A strut shaft has a reduced diameter, threaded end portion defined by a shaft shoulder, wherein the inner plate flange abuts the shaft shoulder. A first nut is threaded onto the threaded end portion of the shaft and presses the lower race against the inner plate flange. A mount retainer includes a retention washer which is secured to the threaded end portion by a second nut.

The significant advantage of the strut top mount according to the present invention is that it utilizes a lightweight polymeric material as its primary structural member, which offers significant mass reduction at a lower cost as compared to a conventional strut top mount having steel as the material of the primary structural member. Yet, while it is to be understood that the utilization of a polymeric material as the primary structural member of a strut top mount is desirable for mass savings, such a substitution for a steel material of a traditional strut mount is not straightforward and is fraught with difficulties due to the high operational stresses placed upon it, and the high stiffness requirement from, the structure of a strut top mount which is hard fastened to the vehicle body structure.

In this regard, therefore, several insights of the present invention need first to be understood: 1) use of a dome shaped mount to strut tower interface with a specific geometric arrangement would allow the steel structure of the vehicle body to support, and therefore greatly reduce, the working stress of the dome shaped mount; and 2) polymeric materials offer the most resistance to damage and the least deformation when stressed in a compressive manner, while minimizing tension and bending stresses.

With the aforementioned inventive insights in mind, there are five main enablers according to the present invention by which a polymeric material can be substituted for the steel material in a single path strut top mount: 1) the outer diameter of the polymeric primary structural member is enlarged as compared to a conventional steel primary structural member, wherein the cross-sectional thickness of the polymeric primary structural member is chosen to provide adequate strength and stiffness; 2) the mount dome is seated in floating, nestled abutment at the support shell of strut tower which serves to embracingly back the main mount component and thereby reduces operational stress in the polymeric primary structural member; 3) a provision is made for maximum jounce loads that ensures that the operational stresses in the rubber and its bonded interface to the polymeric structure do not exceed a tolerable level, whereduring, the jounce bumper plate strikes an abutment element of the resilient body superposed the central polymeric wall of the polymeric primary structural element, whereby the load is transmitted there-through to the strut tower; 4) the mount dome has an inner diameter which is less than the inner diameter of the polymeric primary structural member; and 5) the resilient body interface of the mount dome to the support shell of the strut tower at the outer polymeric wall is angled to create, under vehicle curb weight, compressive stress in the polymeric material of the polymeric primary structural member, wherein, as mentioned, polymeric materials, such as glass reinforced nylon, react much more robustly to compressive stress than to shear or tension.

The low mass polymeric material in the strut top mount of the present invention provides significant mass reduction, for example around a 25% weight reduction over a conventional strut top mount, and this weight reduction is being provided for a motor vehicle component which is positioned high and forward in the motor vehicle. As such, not only achieved is an overall reduction in vehicle mass, but also a lowering of the vehicle center of gravity height and an improvement in front to rear mass distribution.

Accordingly, it is an object of the present invention to provide a strut top mount which utilizes a lightweight polymeric material for the primary structural member, as a replacement for the steel material that is traditionally used, wherein the utilization of the polymeric material is possible because the factors associated with strut top mount stresses are successfully managed by a strategic geometric arrangement of the components thereof and the body structure to which it interfaces.

This and additional objects, features and advantages of the present invention will become clearer from the following specification of a preferred embodiment.

DESCRIPTION OF THE PREFERRED EMBODIMENT

Figure 1:
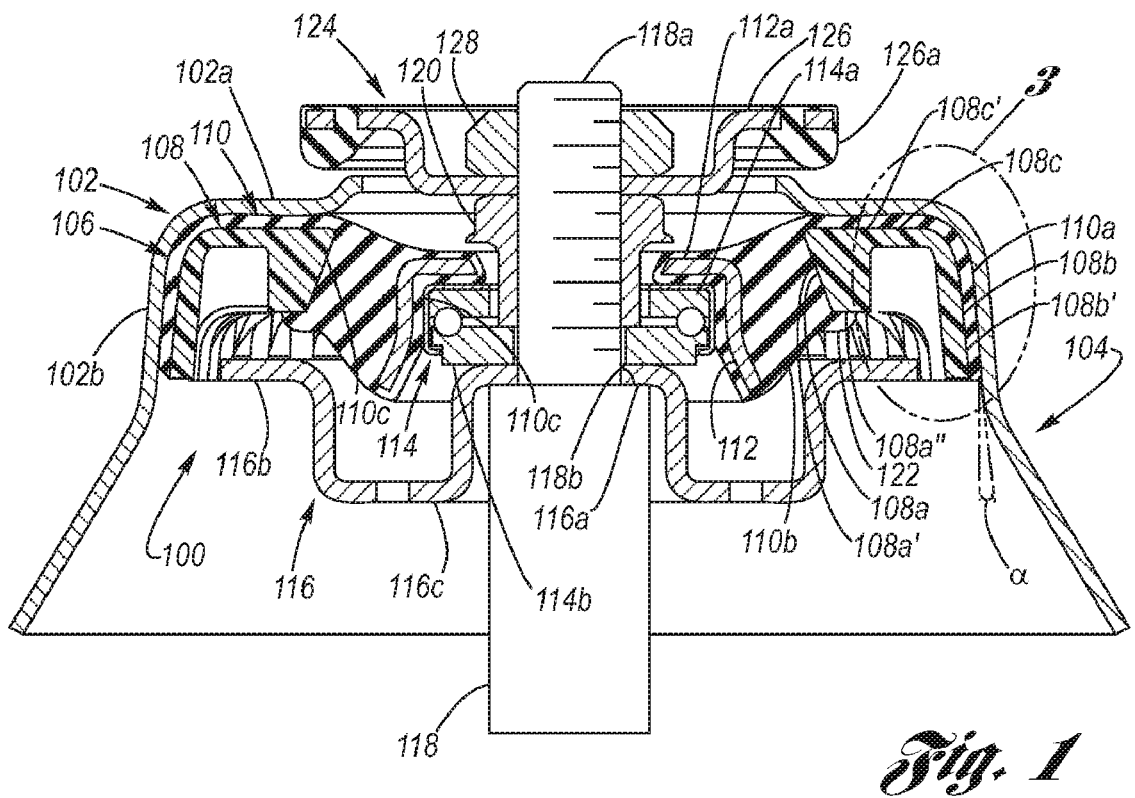
FIG. 1 is a partly sectional side view of a strut top mount according to the present invention.

Referring now to the Drawing, FIGS. 1 through 4 depict various aspects, by way of exemplification and not limitation, of the strut top mount according to the present invention.

Figure 3:
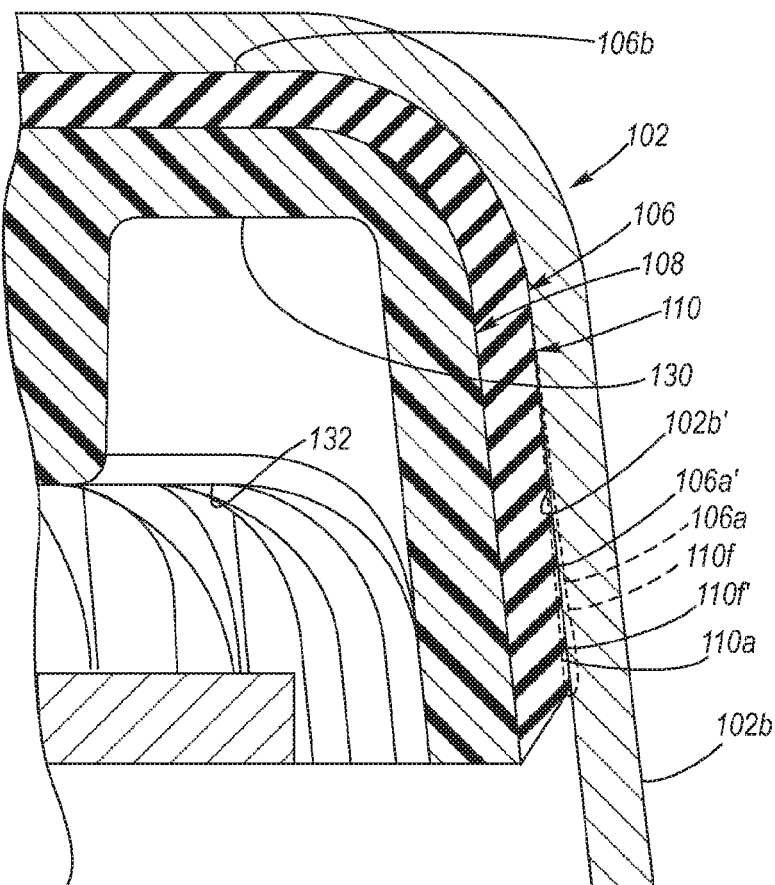
FIG. 3 is a detail sectional view of the strut top mount, seen at circle 3 of FIG. 1.

The single path strut top mount 100 according to the present invention is configured to nestingly interface with a support shell 102 of a strut tower 104 which, at its lower end, is connected (not shown) to the body structure of the motor vehicle. The support shell 102 has a top shell wall 102a and an annular shell sidewall 102b having an acute angle α with respect to a normal of the top wall (see also FIG. 3). The strut top mount 100 of the present invention utilizes a mount dome 106 composed of a lightweight polymeric primary structural member 108, as for example a glass reinforced nylon, and of a resilient body 110, as for example rubber, which is bonded to the polymeric primary structural member. With respect to the nestling, the dome shape of the mount dome 106, defined by a top dome wall 106b and an annular dome sidewall 106a (oriented at an acute angle α' as shown at FIG. 3), is complementary to the shape of the support shell 102 of the strut tower 104, such that the mount dome seats into the support shell 102 in a nestled, abuttingly embraced manner, wherein the polymeric primary structural member 108 is under compression and the resilient body floats in resilient abutment to the support shell, as further discussed in detail hereinbelow.

The polymeric primary structural member 108 is annular, having a central polymeric wall 108a, an outer polymeric wall 108b, and a top polymeric wall 108c spanning the central and outer polymeric walls. An example of a suitable polymeric material is a glass reinforced nylon, as for example a 30% to 50% glass reinforced fiber within the nylon, available, for example, through BASF Corporation of Mount Olive, N.J. 07828.

Figure 2:
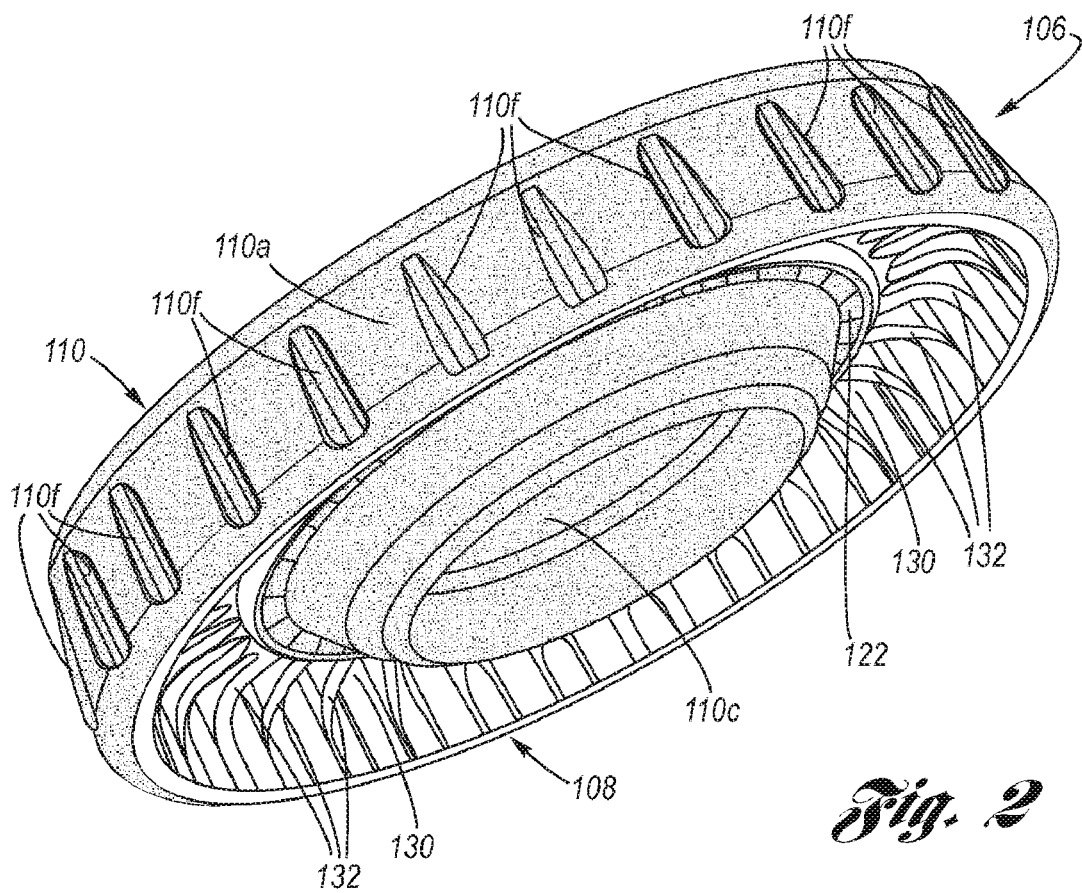
FIG. 2 is a perspective, lower view of the mount dome according to the present invention.

The resilient body 110 partly overmolds the polymeric primary structural member 108, wherein the resilient body is bondingly affixed to the outer surfaces 108b', 108c' of the outer and top polymeric walls 108b, 108c, respectively. In this regard, as best shown at FIGS. 2 and 3, the resilient body 110, serves as a resilient outer element 110a in abutting interface with the top shell wall 102a and shell sidewall 102b of the support shell 102 of the strut tower 104. Further in this regard, the resilient body 110 is bondingly affixed to the inner surface 108a' of the central polymeric wall 108a so as to provide a central resilient element 110b. An annular, generally inverted L-shape metallic insert 112 is located inside the central resilient element 110b, and provides ample bonding surface to the central resilient element so that shear load is widely distributed across the bonding surface thereof. An abutment element 122 of the resilient body 110 is bonded to the central polymeric wall 108a at the bottom surface 108a" thereof. A suitable material for the resilient body is a 55 shore hardness rubber, for example available through Hawthorne Rubber Mfg. Corp., of Hawthorne, N.J. 07507.

A bearing 114 is composed of an upper race 114a abuttingly interfaced with a bearing seat 110c of the central resilient element 110b adjacent the metallic insert 112, and is further composed of a lower race 114b. A jounce bumper plate 116 has an inner plate flange 116a abutting the lower race 114b of the bearing 114, wherein the jounce bumper plate carries a spring seat 116b and a jounce bumper interface 116c. A strut shaft 118 has a reduced diameter, threaded end portion 118a defined by a shaft shoulder 118b, wherein the inner plate flange 116a abuts the shaft shoulder. A first nut 120, as for example a tube nut, is threaded onto the threaded end portion 118a of the strut shaft 118 and presses the lower race 114b of the bearing 114 against the inner plate flange 116a.

A mount retainer 124 includes a retention washer 126 and a retention washer rubber element 126a. The retention mount retainer 124 is secured to the threaded end portion 118a of the strut shaft 118 by a second nut 128.

As shown at FIG. 2, the mount dome 106 is, as described above, a bonded composite of the polymeric primary structural member 108 (shown without shading in FIG. 2) and the resilient body 110 (shown shaded in FIG. 2). The polymeric primary structural member 106 features a recess 130, wherein a plurality of buttresses 132 span the recess, wherein the recess minimizes the mass of the polymeric material, and the buttresses provide strength thereto, particularly as regards the compressive load supplied by the shell sidewall 102b to the outer polymeric wall 108b.

How the compressive load is applied by the shell sidewall 102b of the support shell 102 to the outer polymeric wall 108b of the polymeric primary structural member 108 will now be detailed with additional reference being directed to FIG. 3.

As mentioned hereinabove, the shell sidewall 102b has an acute angle α with respect to a vertical, the vertical being a normal of the shell top wall 102a, which is generally flatly disposed in the horizontal (i.e., the horizontal being perpendicular to the vertical). The mount dome 106 has a dome sidewall 106a (the largest diameter of which is defined by the flutes 110f) which is at an acute angle of essentially also α. To allow for build variation and compression of the polymeric primary structural member 108, the cross-section of the dome sidewall 106a at the flutes 11 Of exceeds the cross-section of the interior surface 102b' of the shell sidewall 102. Accordingly, as shown at FIG. 3, when the mount dome 106 is seated in the support shell 102, the flutes 110f compress to position 110f' and the dome sidewall compresses to position 106a'. The resulting compression of the resilient outer element 110a is applied to the outer polymeric wall 108b, whereby the polymeric primary structural member is under a state of compression.

Operational aspects of the strut top mount 100 will now be discussed.

The support shell 102 of the strut tower 104 provides a steel backing structure of the vehicle body to support the mount dome 106 when nestled therein, whereby greatly reduced is the working stress of the polymeric primary structural member 108. The outer diameter of the outer polymeric wall 108b is enlarged as compared to a conventional steel primary structural member, wherein the cross-sectional thickness is chosen to provide adequate strength and stiffness. The top shell wall 102a of the support shell 102 has an area which generally superposes the top dome wall 106b in juxtaposed relation to the top polymeric wall 108c, wherein the top shell wall and the top dome wall are in mutually parallel disposition.

The dome sidewall and the shell sidewall have a mutual predetermined size relationship and a mutual predetermined angular relationship such that when the dome top surface abuts the shell top surface, the polymeric primary structural member is placed under compression by a resilient compression of the outer resilient element between the polymeric outer sidewall and the shell sidewall. In this regard, the dimensions and angle of dome sidewall 106a, inclusive of the flutes 110f with respect to the interior surface 102b' of the shell sidewall 102b create, under vehicle curb weight, compressive stress in the polymeric material of the polymeric primary structural member, resulting in compression to the polymeric primary structural member 108, wherein, as mentioned, polymeric materials, such as glass reinforced nylon, react much more robustly to compressive stress than to shear or tension.

Figure 4:
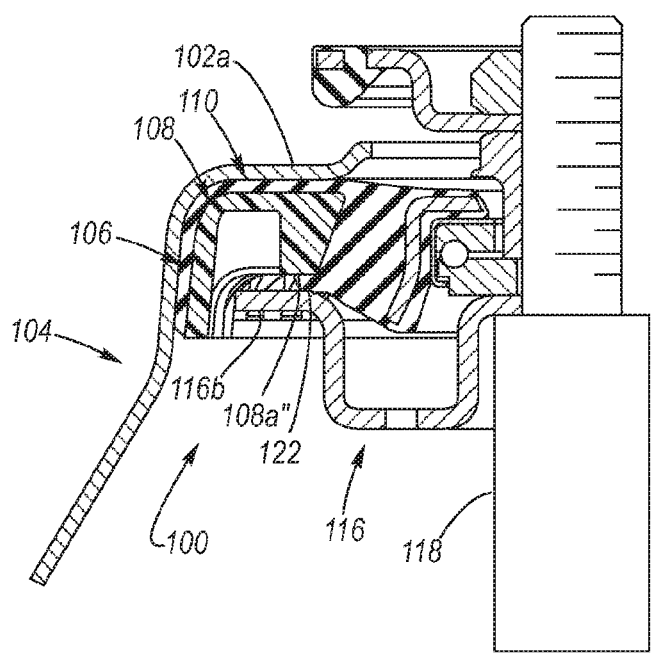
FIG. 4 is a left side, sectional partly view of the strut top mount of FIG. 2, now shown under a maximum jounce load.

The case of operation in a maximum jounce event is shown at FIG. 4. In a maximum jounce load event, it is important that the operational stresses in the resilient body 110 and its bonded interface to the polymeric material of the polymeric primary structural member 108 do not exceed a predetermined tolerable level. In this regard, in a maximum jounce, the jounce bumper plate 116 at the spring seat 116b thereof strikes the abutment element 122 of the resilient body at a location superposed the central polymeric wall 108a of the polymeric primary structural element 108. As such, the jounce load is thereupon bypassed by being transmitted through the central polymeric wall 108a to the top shell wall 102a of the support shell 102 of the strut tower 104. It is preferred for the abutment element 122 to be castellated. In a maximum jounce event, the abutment element 122 serves to snub and arrest vertical displacement without abruptness.

The strut top mount 100 has two operational regions, a low stiffness region of approximately 500 N/mm which affects normal operation and a high stiffness region of approximately 5 kN/mm that affects large jounce load inputs, the two regions being defined by a response "knee" corresponding to when load bypass is engaged; that is, when the jounce bumper plate 116 strikes the abutment element 122. The strut top mount 100 is molded in its full rebound position and when loaded by the corner weight of the vehicle, it shifts up to a position corresponding to approximately half way between the as molded position and the response knee on the load deflection curve.

From the foregoing description, it is seen that the strut top mount 100 according to the present invention provides a significant mass reduction at a lower cost as compared to a conventional strut top mount having steel as the material of the primary structural member.

To those skilled in the art to which this invention appertains, the above described preferred embodiment may be subject to change or modification. Such change or modification can be carried out without departing from the scope of the invention, which is intended to be limited only by the scope of the appended claims.

The invention claimed is:

1. A strut top mount and body structure of a motor vehicle, comprising:
    a strut tower comprising a support shell, said support shell comprising a shell sidewall and a shell top wall; and
    a mount dome having a dome sidewall, said mount dome comprising:
        a polymeric primary support member composed of a polymeric material; and
        a resilient body bonded to said polymeric primary support member, said resilient body having a metallic insert disposed therewithin in distal relation to said polymeric primary support member;
    wherein said polymeric support member comprises:
        a central polymeric wall;
        an outer polymeric wall; and
        a top polymeric wall spanning said central and outer polymeric walls;
    wherein said resilient body is bonded to said outer and top polymeric walls forming thereat an outer resilient assembly, wherein said dome sidewall is disposed at said outer resilient assembly in superposed relation to said outer polymeric wall;
    wherein said resilient body is bonded to said central polymeric wall forming thereat a central resilient assembly at which is disposed said metallic insert;
    wherein said mount dome is seated in abutting relation with said support shell such that said outer resilient assembly is in abutting relation with said shell sidewall and said shell top wall; and
    wherein said dome sidewall and said shell sidewall have a mutual predetermined size relationship and a mutual predetermined angular relationship such that said polymeric primary support member is placed under compression by a resilient compression of said outer resilient assembly between said outer polymeric sidewall and said shell sidewall.

2. The strut top mount and body structure of claim 1, wherein said polymeric material comprises a glass reinforced nylon material.

3. The strut top mount and body structure of claim 1, wherein said polymeric primary support member has an annular recess formed therein between said central and outer polymeric walls; and wherein a plurality of buttresses are disposed in said recess spanning between said central and outer polymeric walls.

4. The strut top mount and body structure of claim 3, further comprising:
    a plurality of flutes integrally formed on said resilient body superposed said outer polymeric wall;
    an abutment element formed on said resilient body; and said central polymeric wall having a bottom surface oppositely disposed with respect to said top polymeric wall, wherein said abutment element of said resilient body is bonded to said bottom surface.

5. The strut top mount and body structure of claim 4, further comprising:
a bearing having an upper race adjoining said central resilient assembly adjacent said metallic insert; and
a jounce bumper plate adjoining a lower race of the bearing;
wherein said jounce bumper plate is disposed in relation to said abutment element such that in a maximum jounce event, said jounce bumper plate strikes said abutment element,
wherein load of the jounce is transmitted through said central polymeric wall to said shell top wall.

6. The strut top mount and body structure of claim 5, further comprising:
a strut shaft having a threaded end portion, said threaded end portion being defined by a shaft shoulder; and
a first nut threaded on said threaded end portion, said first nut affixing said lower race and said jounce bumper place with respect to said shaft shoulder.

7. The strut top mount and body structure of claim 6, further comprising:
a mount retainer comprising a retention washer; and
a second nut threaded on said threaded end portion, said second nut affixing said mount retainer to said strut shaft.

8. A strut top mount and body structure of a motor vehicle, comprising:
a strut tower comprising a support shell, said support shell comprising a shell sidewall and a shell top wall; and
a strut top mount comprising a mount dome, said mount dome comprising:
a polymeric primary support member composed of a polymeric material, said polymeric primary support member comprising a central polymeric wall, an outer polymeric wall, and a top polymeric wall spanning said central and outer polymeric walls, wherein said polymeric primary support member has an annular recess formed therein between said central and outer polymeric walls, and wherein a plurality of buttresses are disposed in said recess spanning between said central and outer polymeric walls, and wherein said central polymeric wall has a bottom surface oppositely disposed with respect to said top polymeric wall; and
a resilient body bonded to said polymeric primary support member, said resilient body having a metallic insert disposed therewithin in distal relation to said polymeric primary support member, wherein an abutment element of said resilient body is bonded to said bottom surface of said central polymeric wall; and
a jounce bumper plate, wherein said jounce bumper plate is disposed in relation to said abutment element such that in a maximum jounce event, said jounce bumper plate strikes said abutment element, wherein load of the jounce is transmitted through said central polymeric wall to said shell top wall;
wherein said resilient body is bonded to said outer and top polymeric walls, forming thereat an outer resilient assembly, wherein a dome sidewall is disposed at said outer resilient assembly in superposed relation to said outer polymeric wall;
wherein said resilient body is bonded to said central polymeric wall forming thereat a central resilient assembly at which is disposed said metallic insert;
wherein said mount dome is seated in abutting relation with said support shell such that said outer resilient assembly is in abutting relation with said shell sidewall and said shell top wall; and
wherein said dome sidewall and said shell sidewall have a mutual predetermined size relationship and a mutual predetermined angular relationship such that said support shell, said polymeric primary support member is placed under compression by a resilient compression of said outer resilient assembly between said outer polymeric sidewall and said shell sidewall.

9. The strut top mount and body structure of claim 8, further comprising a plurality of flutes integrally formed on said resilient body superposed said outer polymeric wall;
wherein said polymeric material comprises a glass reinforced nylon material.

10. The strut top mount and body structure of claim 9, further comprising:
a bearing having an upper race adjoining said central resilient assembly adjacent said metallic insert, said jounce bumper plate adjoining a lower race of the bearing;
a strut shaft having a threaded end portion, said threaded end portion being defined by a shaft shoulder; and
a first nut threaded on said threaded end portion, said first nut affixing said lower race and said jounce bumper place with respect to said shaft shoulder.

11. The strut top mount and body structure of claim 10, further comprising:
a mount retainer comprising a retention washer; and
a second nut threaded on said threaded end portion, said second nut affixing said mount retainer to said strut shaft.

* * * * *